United States Patent
Perazzi et al.

(10) Patent No.: US 9,900,505 B2
(45) Date of Patent: Feb. 20, 2018

(54) PANORAMIC VIDEO FROM UNSTRUCTURED CAMERA ARRAYS WITH GLOBALLY CONSISTENT PARALLAX REMOVAL

(71) Applicants: Disney Enterprises, Inc., Burbank, CA (US); Eidgenössische Technische Hochschule Zürich (ETH Zürich), Zürich (CH)

(72) Inventors: Federico Perazzi, Burbank, CA (US); Alexander Sorkine Hornung, Burbank, CA (US); Henning Zimmer, Burbank, CA (US); Oliver Wang, Burbank, CA (US); Peter Kaufmann, Burbank, CA (US); Scott Watson, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 743 days.

(21) Appl. No.: 14/339,253

(22) Filed: Jul. 23, 2014

(65) Prior Publication Data

US 2016/0028950 A1    Jan. 28, 2016

(51) Int. Cl.

| | |
|---|---|
| *H04N 7/00* | (2011.01) |
| *H04N 5/232* | (2006.01) |
| *H04N 5/247* | (2006.01) |
| *H04N 5/265* | (2006.01) |
| *G06T 3/40* | (2006.01) |
| *H04N 5/225* | (2006.01) |
| *H04N 5/262* | (2006.01) |

(52) U.S. Cl.
CPC ....... *H04N 5/23238* (2013.01); *G06T 3/4038* (2013.01); *H04N 5/2258* (2013.01); *H04N 5/247* (2013.01); *H04N 5/265* (2013.01); *H04N 5/2628* (2013.01)

(58) Field of Classification Search
None
See application file for complete search history.

(56) References Cited

U.S. PATENT DOCUMENTS

| | | | |
|---|---|---|---|
| 2002/0122113 A1* | 9/2002 | Foote | G06T 3/4038 348/48 |
| 2009/0040293 A1* | 2/2009 | Foo | G03B 37/04 348/36 |
| 2009/0148051 A1* | 6/2009 | Pham | G06K 9/32 382/219 |
| 2011/0273582 A1* | 11/2011 | Gayko | G06T 5/005 348/222.1 |

* cited by examiner

*Primary Examiner* — James M Anderson, II
(74) *Attorney, Agent, or Firm* — Fay Kaplun & Marcin, LLP

(57) ABSTRACT

Systems and methods for generating a panoramic video from unstructured camera arrays. The systems and methods are configured to statically align corresponding image-frames of respective input video streams, warp the aligned image-frames according to a warping-order, and relax the warped image-frames thereby generating a temporally coherent panoramic video. Methods according to embodiments this invention utilize a new parallax-warping-error metric that is devised to capture structural differences created by parallax artifacts. The parallax-warping-error metric is effective in finding an optimal warping-order and in driving the warping process, resulting in a panoramic video with minimal parallax artifacts.

19 Claims, 4 Drawing Sheets

PANORAMIC VIDEO FROM UNSTRUCTURED CAMERA ARRAYS WITH GLOBALLY CONSISTENT PARALLAX REMOVAL

FIELD OF INVENTION

Embodiments of the present invention relate to methods and systems for video image stitching directed at panoramic video construction out of multiple video streams.

BACKGROUND OF INVENTION

Panoramic presentations are popular for the immersive experience that they offer viewers. Museums, recreational parks, and theaters have been playing documentaries and entertainment content in panoramic views for quite some time now. This content has been projected onto large spherical or semi-spherical domes wherein viewers experience motion sensation and engulf themselves in a virtual reality. Other applications of interest for panoramic video are in the domain of low scale television production. Therein, a high-resolution high-quality panoramic video is constructed as an intermediate video feed from which a region-of-interest may be cut to create the final program. Such a system for live panorama construction not only allows for efficient production of low-scale events, but also provides flexibility in generating more than one program from a given panorama as well as producing playbacks of unpredictable happenings in the scene that otherwise may have been missed by traditional television coverage practices.

Broadcast quality cameras are limited by the field-of-view they cover. Using wide-angle lenses produces spatial distortion and image blur. Therefore, it is common in the art to combine images from multiple views to form a high-quality wide-angle panoramic view. Seamlessly tiling images captured by one palming camera may provide a panoramic view of the scene covering up to 360 degrees. Stitching together images that were captured by different cameras, though, not only requires accurate pairwise image alignment, but also requires radiometric and spatial corrections to compensate for differences in the cameras' exposure-times and lens' characteristics. Combining images from several cameras is also complicated by parallax artifacts since physical cameras cannot share the same projection-center. Most existing systems for panoramic video stitching include cameras that are placed at predefined spatial locations (e.g. on a grid). Typically, this regular camera placement is a design constraint that limits the flexibility and efficiency of system setting at the field.

Prior technologies focused on stitching images captured by the same camera. The main challenge in this setting is to seamlessly align the images onto each other. Image alignment (registration) is a known in the art process that is applicable to myriad domains such as cartography, super-resolution, and biomedical image registration. It deals with finding the mathematical transformation (mapping) that maps a location in one image to its corresponding location in a second image, where corresponding image locations represent image-projections of the same physical point at a scene. Different transformation models may be used to spatially deform (map) one image to match the other. For example, global parametric models (e.g. affine or perspective) may be used to compensate for differences in view angles and focal lengths. Non-linear models may be needed to compensate for local deformations using, for example, optical flow based methods.

Two main approaches for image registration are common in the art: feature-based and image-based (direct) alignments. In a feature-based alignment the transformation is resolved based on corresponding pairs of features. Discriminating features based on local image characteristics may be extracted from the images that are to be aligned. For example, scale- and orientation-invariant features such as SIFT or ASIFT are commonly used in the art. In an image-based alignment, overlapping pixels from the two images to be aligned are compared directly. Being compared directly, the steps of extracting features and finding feature pair correspondences are not required in an image-based alignment. Nevertheless, image-based registration is limited in the range it can cover. Therefore, image-based registration is often used as a refinement step after a feature-based registration was employed. Both feature-based and image-based registration methods require a similarity metric or a distance metric to drive the optimization process that is targeted at finding the optimal transformation. The metric used can, for example, be the Euclidean distance between corresponding features or any similarity (or distance) between image characteristics measured within a neighborhood (patch) of the corresponding feature locations.

Constructing a panorama out of multiple cameras requires preprocessing the respective cameras' images to compensate for the differences in the cameras' intrinsic parameters. To compensate for camera-specific lens' characteristics, the lens distortion is typically modeled as a radial distortion. In a radial distortion model the captured image is spatially distorted as a function of the radial distance from the center, and may be compensated for by employing a low order polynomial model. Differences in the cameras' exposure-times may also be compensated for. Camera exposure-time affects the radiometric attributes of the captured image. Radiometric differences between two corresponding images may impair the accuracy of their alignment. Hence, methods in the art for correcting radiometric discrepancies (color balancing) are typically employed across the images captured by multiple cameras before combining them into a panoramic image.

Another challenge in stitching images captured by multiple cameras is the inevitable difference in the cameras' projection-centers. The differences in the cameras' projection-centers lead to known in the art parallax artifacts that stein from discrepancies in the image-projections of corresponding structures. When attempting to align these images, visual distortions such as blurring, ghosting, and discontinuities result. These parallax distortions may be minimized using miniature camera arrays where cameras are positioned close to each other. The minimal distance between a pair of cameras, though, is limited by the size of these cameras. These tend to be relatively large for high-quality broadcast cameras. Various stitching methods that are designed to reduce parallax artifacts are known in the art. A known approach is to hide the parallax artifacts employing seam optimization via graph cuts. Seams based methods attempt to "hide" the parallax distortions by cutting through well aligned image regions rather than removing the parallax artifacts between the views. Though effective for some applications, finding well aligned regions may be difficult for video with high motion or high cluttered content. Another approach is to warp the images to locally compensate for parallax distortions. For example, a common method is to warp the overlapping regions of the aligned images using an optical flow based method. This approach is limited by the quality of the estimated optical flow that is susceptible to the input video frames' temporal synchronization accuracy, video images quality, and the distance metric (warping error) in use. A distance metric that efficiently captures the structural parallax distortions is required for effective parallax removal.

In addition to providing seamless image alignment, effective techniques for combining corresponding image-frames from multiple video streams need to account for the temporal coherency of the output panoramic video. Otherwise, inconsistency in successive panoramic video frames may create perceptible distortions, resulting in a panoramic video that is not on a par with broadcast quality programming. In addition to high quality demands, the panorama construction method should be able to process multiple high-resolution image-frames in real-time, allowing for live panoramic video computation. Especially, in panoramic video from which a live program is cut, and where zooming-in at various region-of-interests within the panoramic view is required, high image quality is a main concern.

Common panoramic video systems include the process of camera calibration and 3D reconstruction, followed by 3D scene projection onto a desired image plane. In practice, high quality and temporally stable 3D reconstruction is a difficult task with high complexity. Many commercially available panoramic video systems are based on pre-calibrated and miniaturized camera arrays. While the requirement for camera calibration complicates the system's initialization procedure, constraining the cameras' physical size (to reduce parallax) limits the application domain as professional high-end cameras are physically large. Panoramic video construction systems and methods that are tractable and effective in reducing parallax artifacts without constraining the cameras' size and array structure are needed.

BRIEF DESCRIPTION OF THE DRAWINGS

Embodiments of the invention are described with reference to the accompanying drawings.

DETAILED DESCRIPTION

Methods and systems for creating high resolution panoramic video from an unstructured camera array with globally consistent parallax removal are provided. Embodiments of the invention disclosed herein are described in the context of creating panoramic video content to be presented to viewers as well as an intermediate content form to be used in creating cut programs. While particular application domains are used to describe aspects of this invention, it should be understood that the invention is not limited thereto. Those skilled in the art with access to the teachings provided herein will recognize additional modifications, applications, and embodiments within the scope thereof and additional fields in which the invention would be of significant utility.

Figure 1:
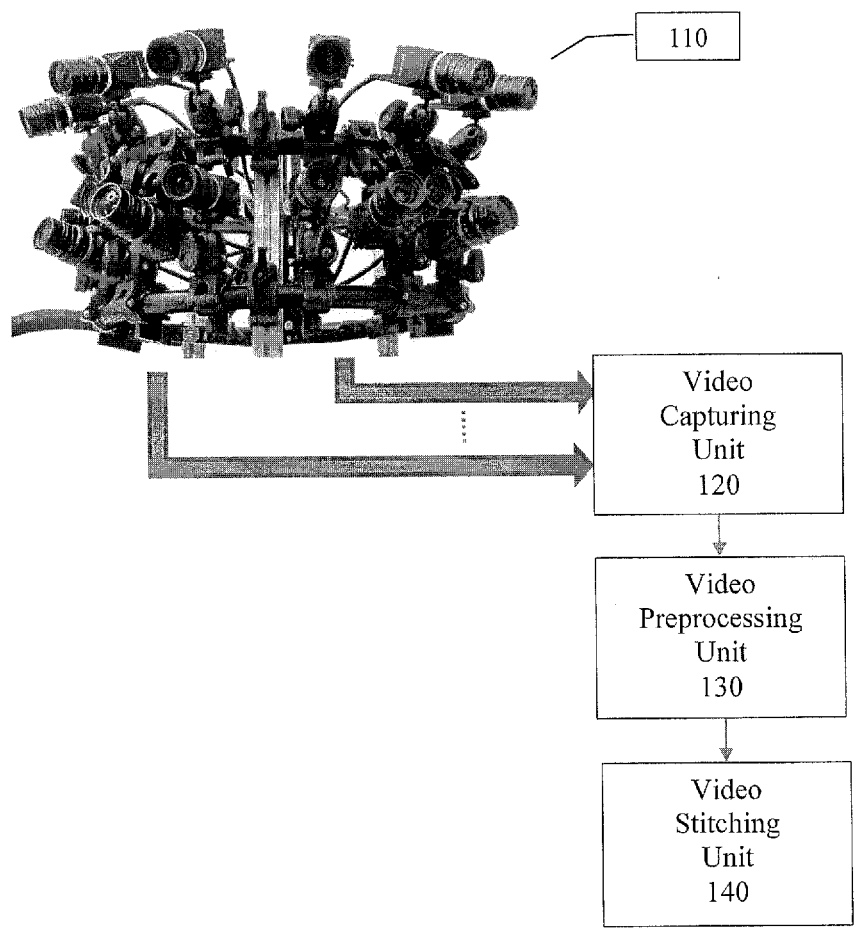
FIG. 1 shows an embodiment of a panoramic video system.

An embodiment for creating video panorama is shown in FIG. 1. The panoramic video system 100 includes a camera rig 110, a video capturing unit 120, a video preprocessing unit 130, and a video stitching unit 140. The camera rig holds together multiple cameras in unstructured relative positions. This flexibility in camera pose configuration allows for using large high-end cameras suitable for broadcast quality standards. As long as the cameras maintain sufficient pairwise image overlap-regions to facilitate accurate image alignment, a temporal coherent panoramic video may be created according to embodiments of this invention while tolerating rig movements and changes in relative displacement among cameras. The cameras' video streams are buffered by the video capturing unit 120 that produces temporally corresponding (synchronized) image-frames for downstream preprocessing. The video preprocessing unit 130 processes the received image-frames; it compensates for differences resulting from camera-specific intrinsic attributes, such as variations in lens' characteristics and the cameras' exposure-times. Once lens distortions and exposure-time differences are compensated for across corresponding image-frames, the task of stitching these images into an output panorama frame is carried out by the video stitching unit 140.

Figure 2:
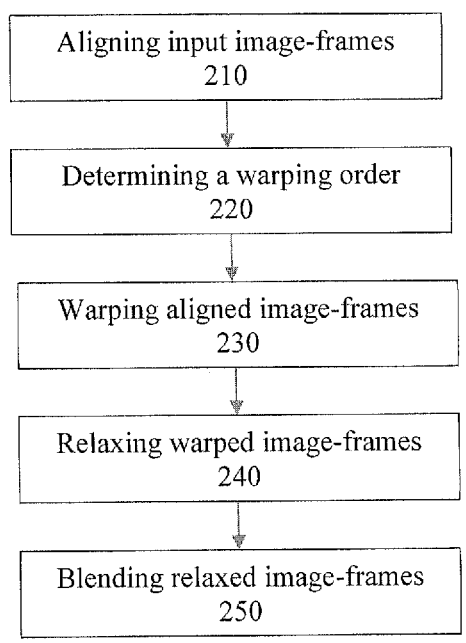
FIG. 2 shows a method for panoramic video construction according to one embodiment of the present invention.
Figure 3:
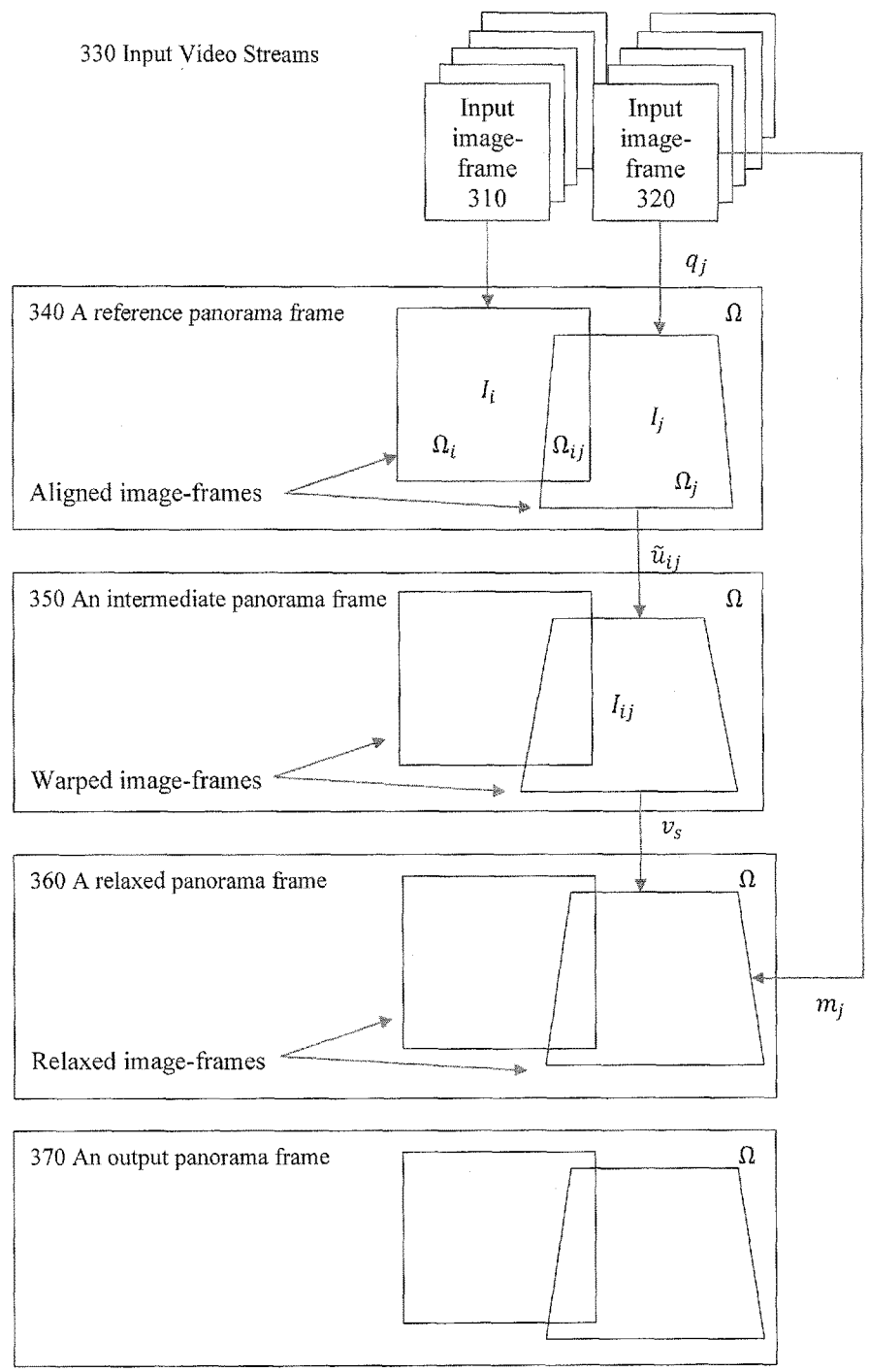
FIG. 3 shows a flowchart illustrating the different phases in panoramic video construction according to one embodiment of the present invention.
Figure 4:
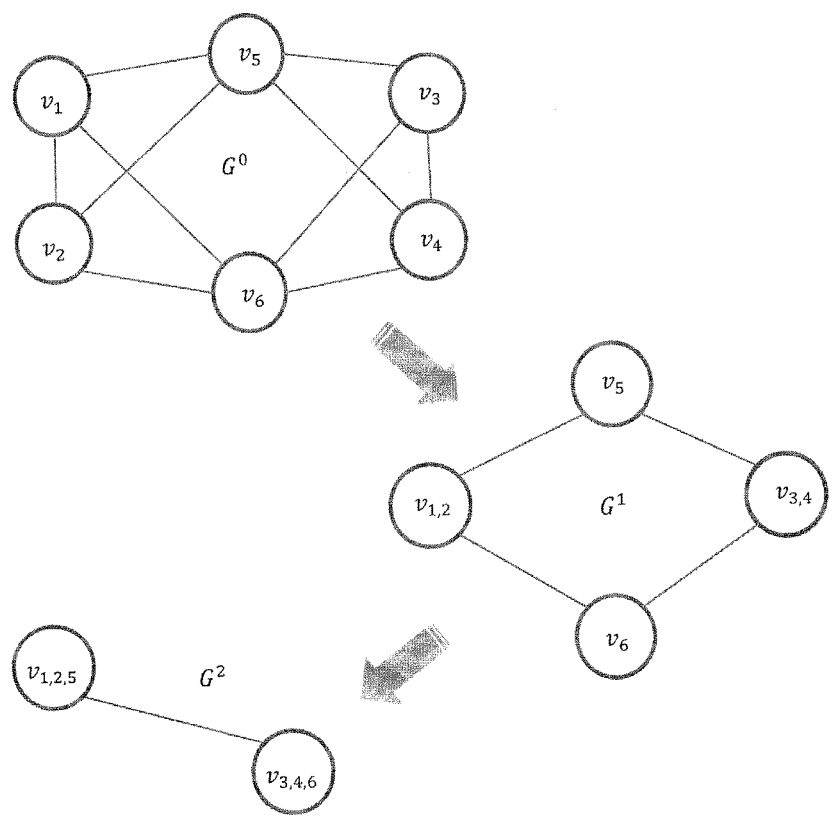
FIG. 4 shows a flowchart illustrating the process of ordering pairwise image warping according to one embodiment of the present invention.

The process of seamlessly stitching corresponding image-frames to form a temporal consistent video panorama is described in reference to FIGS. 2, 3, and 4. The first and initial step 210 in creating a panorama includes bringing all corresponding frames (e.g. image-frames 310 and 320) into the same image space. A feature-based registration method may be used to globally map the input image-frames onto a reference image space. This initial alignment, referred to hereafter as the static alignment, involves finding a transformation that spatially maps one image-frame onto another. Any alignment method known in the art may be used to calculate pairwise image alignments as long as these alignments are accurate enough to allow for further refinement of the mappings (e.g. employing optical flow based methods) for parallax removal, as will be explained further below. The aligned image-frames may then be projected onto a user-defined plane such as a cylinder, a hemisphere, or a sphere. For example, to present the panorama on a spherical dome, a fisheye projection surface is commonly used. For simplicity of presentation, a planar projection surface 340 is assumed, as illustrated in FIG. 3. Therein, input image-frames 310 and 320 are aligned and projected onto the planar projection surface $\Omega$ resulting in the aligned image-frames $I_i$ and $I_j$.

Following the static alignment step 210, the resulting reference panorama 340 includes two aligned image-frames $I_i$ and $I_j$, spanning image regions defined by the subsets: $\Omega_i \in \Omega$ and $\Omega_j \in \Omega$, respectively. Though the pair of images are registered by virtue of the static alignment, parallax artifacts remain in the overlapping region $\Omega_{ij} = \Omega_i \cap \Omega_j$. The parallax is removed according to embodiments of this invention by locally deforming (warping) one image $I_j$ to match the other image $I_i$ within the overlapping region. This local warping, first employed throughout the overlapping regions of the reference panorama frame, is then extrapolated into the non-overlapping regions to prevent discontinuities along the boundaries of the overlapping regions (e.g. $\Omega_{ij}$), as will be explained in detail below.

A parallax removal warping process is first employed within the intersection $\Omega_{ij}$ using a deformation (motion) field function $u_{ij}$, defining the displacement between a pixel $x_i$ in the image-space of $I_i$ and a pixel $x_j$ in the image-space of $I_j$, as follows: $x_j = x_i + u_{ij}(x_i)$. Knowing $u_{ij}(x_i)$ allows the warping of $I_j$ onto the image-space of $I_i$ via a backward warping operation that results in the warped image-frame $I_{j \to i}(x_i) \equiv I_{ij}$.

The motion field may be computed based on known in art optical-flow estimation methods. Other methods for calculating the motion field based on sparse features utilizing parametric deformation maps may also be used. Computing dense optical-flow, however, is advantageous as it is more flexible in overcoming artifacts such as rolling shutter or slightly unsynchronized frames.

Generally, a panorama consists of multiple images jointly aligned. Hence, the motion field between multiple pairs of overlapping images in the panorama should be computed. For example, for N input views, each pixel $x_i$ may have $M<N$ motion fieds $u_{ij}$ corresponding to the overlapping images $\{I_j, j \in [1,M]\}$. Computing a dense motion field is computationally expensive though, especially that it is needed for all overlapping pairs and for every video frame. An alternative approach, then, is to align sequentially one image onto its predecessor to build up the panorama in a linear fashion. The quality of the final panorama in this approach depends on the ordering of the pairwise image alignment, as the size and content of the overlapping regions affect the warping accuracy.

Embodiments according to this invention provide an optimal warping ordering method, wherein images are sequentially warped to form a panorama with linear complexity. This is especially suited for live video stitching that includes a large number of high-resolution input views. Thus, as the quality of the pairwise image warping depends on the size and the content of the overlapping regions, an optimal ordering exists wherein images with large overlap-region and discriminative corresponding content are paired. The optimal warp ordering is determined based on analysis of the overlap-region size and warping accuracy between pairs of aligned image-frames. This ordering may be computed for each panoramic frame or may be computed once and then applied to the warping in successive panoramic frames. Typically, a certain input image-frame consistently covers the same scene part (e.g. sky, ground, etc.), and therefore computing the warping ordering once may suffice.

Hence, embodiments of this invention determine the optimal ordering of pairwise warping so that the combined warping-quality is maximized. The warping ordering is carried out using a graph model for the panorama structure. The panorama structure is represented by an undirected graph $G=(V,E)$, where the nodes $v_i \in V$ represent the panorama's image-frames and the edges $e_{ij} \in E$ connect nodes associated with overlapping images $I_i$ and $I_j$. For each edge in the graph there is defined a weight $w_{ij}$ that scores the potential warping-quality between pair of images associated with the respective connected nodes. This score may be based on the amount of overlap-region $\Omega_{ij}$ and a warping-accuracy measure as follows:

$$w_\downarrow ij = |\Omega_\downarrow ij|^{\uparrow} \alpha \exp(-\min\{\phi(I_\downarrow ij), \phi(I_\downarrow ji)\}). \quad (1)$$

Where $\phi(\bullet)$ measures the warping error between a pair of warped image-frames based on a metric designed to capture the degree of disagreement between corresponding pixels from $I_i$ and $I_{ij}$. Specifically, according to an embodiment, an error function $\phi(\bullet)$ is devised to capture structural error caused by parallax as will be described in detail below. The parameter $\alpha$ controls the relative strength of the overlap-region term (i.e. $|\Omega_{ij}|$) and the warping-accuracy measure term (i.e. $\exp(-\min\{\phi(I_\downarrow ij) \cdot \phi(I_\downarrow ji)\})$). For example, $\alpha=0.5$ limits the influence of large overlapping areas so that a small overlapping area with high warping-accuracy measure will not be overruled by a large overlapping area with low warping-accuracy measure. Another alternative for the warping-quality score may be:

$$w_\downarrow ij = 1 - \gamma(\{\min\{\phi(I_\downarrow ij) \cdot \phi(I_\downarrow ji)\})/|\Omega_\downarrow ij|^{\uparrow \alpha}, \quad (2)$$

where $\gamma$ is a normalization factor scaling $w_{ij}$ within the range of $[0,1]$. To simplify the graph and avoid warping pairs of images with low overlap-region, a pair of nodes may be connected only if their associated images' overlap is above a certain threshold.

Starting with an initial $G^0 \equiv G$ graph, as defined above, the image-frames' pairing and warping-order that result in the maximum combined warping accuracy is determined. The graph is then updated by replacing nodes $(v_i, v_j) \in V$, corresponding to a pair of warped images $I_i$ and $I_j$, with a new node $v_{ij}$, corresponding to the new warped image $I_{ij}$. This procedure results in a new graph denoted by $G^1 = (V^1, E^1)$. New weights are then calculated, according to a warping-quality score such as the term shown in equation (1) or (2), between the new edge-connected nodes. This process is demonstrated in FIG. 4. Therein the initial graph $G^0$ consists of five images (aligned image-frames) to be warped into an intermediate panorama frame 350. Images with sufficient overlap are connected by edges and their respective warping-quality scores (weights), $$[\{w\}_{1,2}, w_{1,5}, w_{1,6}, w_{2,5}, w_{2,6}, w_{3,5}, w_{6,6}, w_{3,4}, w_{4,6}, w_{4,5}\}].$$

are calculated. Next, the warping pairing that maximizes the combined warping-quality scores is selected as the optimal warping pairing. For example, the optimal warping pairing may lead to the pairwise warping of images $I_{1,2}$ and $I_{3,4}$, resulting graph $G^1$. Hence, graph $G^1$ includes nodes corresponding to images $I_{1,2}, I_{3,4}, I_5$, and $I_6$. A new set of weights is then calculated:

$$[\{w\}_{1,2,5}, w_{3,4,5}, w_{1,2,6}, w_{3,4,6}\}].$$

Once again, images are paired so that the combined warping-quality scores is maximized, resulting in a third graph $G^2$ that consists of nodes associated with images $I_{1,2,5}$ and $I_{3,4,6}$. Images $I_{1,2,5}$ and $I_{3,4,6}$ are warped last in this warping ordering. This ordering may be calculated once, for instance, for the image-frames at the beginning of the respective input video streams and be used again to warp successive groups of image-frames.

The motion field that drives the parallax removal warping operation 230 is computed for each pair of input images according to the ordering process 220 described above. Known in the art techniques for non-linear image registration may be used to optimally warp image $I_j$ onto the target image $I_i$. An embodiment of this invention measures the distance between the warped image $I_{ij}$ and the original input images $I_i$ and $I_j$ to drive the warping process. Specifically, a new metric, referred to herein as parallax-warping-error, is disclosed herein, that quantifies the structural differences contributed by parallax. This new parallax-warping-error metric captures structures in $I_{ij}$ that do not exist in $I_i$ or $I_j$ and, therefore, represent parallax artifacts. Moreover, being a patch-based metric, it is not susceptible to possible outliers in the estimated motion field as will be explained in detail below.

The error function $\phi(x)$ captures the contribution of a pixel $x \in \Omega_{ij}$ in $I_{ij}$ to the parallax-warping-error, denoted by $\phi(\Omega_{ij})$. $\phi(x)$ consists of two types of metrics. The first metric type measures the distance between a patch $p_{ij} \in I_{ij}$ that includes x and the corresponding patch $p_i \in I_i$. This first metric type is denoted by $[d(I]_{ij}, I_i)$, where $d(\bullet)$ may be any distance function such as $$[\![d_i(I)]\!]_{ij}, I_i) = \sum_{x_k \in p} \|I_{ij}(x_k) - I_i(x_k)\|^2, \quad (3)$$

Where p denotes a patch in $I_{ij}$ containing x, and $x_k$ is a vector including the concatenation of all the pixels in p.

The second metric type measures the distance between a patch $p_{ij} \in I_{ij}$ that includes x and the corresponding patch $p_j \in I_j$. In this case the comparison is not straightforward because $p_{ij} \in I_{ij}$ needs first to be mapped back to the image space of $I_j$. In mapping a patch from $I_{ij}$ back to the corresponding patch in $I_j$, a parametric transformation is used to avoid dependency on possible local outliers in the current estimate of the motion field $u_{ij}$. For example, a homography H may be fitted to the optical flow defined within $p_{ij}$ that projects the patch $p_{ij}$ onto its corresponding patch $p_j$ in $I_j$. Hence, the distance in this case may be:

$$[\![d_j(I)]\!]_{ij}, I_j) = \sum_{x_k \in p} \|I_{ij}(x_k) - I_j(Hx_k)\|^2. \quad (4)$$

The above two metric types may be combined into one expression:

$$[\![d_*(I)]\!]_{ij}, I_*) = \sum_{x_k \in p} \|I_{ij}(x_k) - I_*(Hx_k)\|^2, \quad (5)$$

where * denotes either i or j and H is equal to the identity matrix if $I_* = I_i$.

The error function $\phi(x)$, as provided by embodiments of this invention, includes error measures computed from all patches including a certain x, as follows:

$$\phi(x) = \sum_{p \ni x}^* \omega(d_*)[\![d_*(I)]\!]_{ij}, I_*) \quad (6)$$

Where $p \ni x$ denotes the set of all patches containing x. A weight function $\omega(d_*)$ is also introduced that weighs the patches' error contribution as a function of $d_*$. The weight term is optional and may be $\omega(d_*) = \exp(-d_*)$, for example. In an embodiment, the parallax-warping-error may be employed on feature images instead of directly employing it on images $I_j$, $I_i$, and $I_{ij}$. For example, gradient images $G_j$, $G_i$, and $G_{ij}$ may be used. In such a case the terms in equation (5) and (6) may be expressed as:

$$[\![d_*(G)]\!]_{ij}, G_*) = \sum_{x_k \in p} \|G_{ij}(x_k) - G_*(Hx_k)\|^2, \quad (7)$$

and $$\phi(x) = \sum_{p \ni x}^* \omega(d_*)[\![d_*(G)]\!]_{ij}, G_*), \quad (8)$$

respectively.

The total warping error (i.e. parallax-warping-error) associated with the overlapping region $\Omega_{ij}$ is therefore:

$$\phi(\Omega_{ij}) = \sum_{x \in \Omega_{ij}} \phi(x). \quad (9)$$

According to embodiments of this invention, then, the sequential warping process, using an optimal ordering, warps one image $I_j$ onto another image $I_i$ using a motion field that minimizes the parallax-warping-error $\phi(\Omega_{ij})$ throughout the region $\Omega_{ij}$ and thereby significantly reduces parallax artifacts.

The second part of the warping in step 230 includes extrapolating the computed motion field into the non-overlapping areas of $I_{ij}$. This prevents discontinuities along the boundaries of $\Omega_{ij}$, denoted by $\partial \Omega_{ij}$. This extrapolation may be formulated as an energy minimization problem as follows:

$$E(\tilde{u}_{ij}) = \int_{\overline{\Omega}_{ij}} |\nabla \tilde{u}_{ij}|^2 dx, \quad (10)$$

where $\overline{\Omega}_{ij}$ denotes the non-overlapping part of images $I_i$ and $I_{ij}$ through which the motion field $u_{ij}$ is extrapolated into. The energy in equation (10) is minimized by solving the corresponding Eular-Lagrange equation $\Delta \tilde{u}_{ij} = 0$ with Dirichlet boundary conditions: $\tilde{u}_{ij} = u_{ij}$ along $\partial \Omega_{ij}$. To further insure that $\tilde{u}_{ij}$ at pixels located far away from the overlapping region $\Omega_{ij}$ attenuates to zero, another set of Dirichlet boundary conditions may be added: $\tilde{u}_{ij} = 0$ along the level set $L_c(f) = c$. The function $f(x)$ measures the minimum distance of a pixel x from any point in $\Omega_{ij}$ and c may be set to 10% of the output panorama resolution. Known in the art solvers may be used to solve this differential equation. The parallax-extrapolation above completes the parallax-removal warping step 230 with estimated motion fields (e.g. $\tilde{u}_{ij}$) that when applied to the respective aligned image-frames (e.g. $I_{ij}$) result in an intermediate panorama frame 350 including warped image-frames.

In attempting to compensate for parallax distortion by warping one image onto the other, the resulting warped image-frames in the intermediate panorama image-frame 350 have diverted from the corresponding reference panorama frame 340. These diversions create temporal incoherency in the panoramic video. To address this temporal incoherency, a global relaxation process is employed in step 240 that is constrained by the reference projection. Hence, a relaxed panorama mapping is computed according to embodiments of this invention to conform the intermediate panorama 350 with the reference panorama 340 without compromising the motion fields that were optimized to compensate for the parallax distortion (e.g. $\tilde{u}_{ij}$). To this end, the backward-map that maps an output-pixel from a warped image-frame in the intermediate panorama to an input-pixel in the corresponding aligned image-frame in the reference panorama is denoted by v. This map v may be calculated based on the motion fields estimated in the warping step 230 (e.g. $\tilde{u}_{ij}$), where if multiple input pixels (from corresponding aligned image-frames) contribute to the same output-pixel, v maps this output pixel to the average position of its contributing pixels. The new relaxed-map $v_s$ is the map that minimizes the following energy:

$$E(v_s) = \int_\Omega \omega(x)|v_s - v|^2 + \lambda |\nabla v_s|^2 dx, \quad (11)$$

where $\Omega$ denotes the panorama domain. The first term enforces fidelity between the relaxed-map $v_s$ and the map v. The weight $\omega$ may be adaptive and assume different values within overlapping regions $\Omega_{ij}$ and non-overlapping regions $\Omega \backslash \Omega_{ij}$. For example, $\omega$ may be set to zero within overlapping regions and set to non-zero within non-overlapping regions (e.g. ω=1 at the outer panorama boundaries). The second term enforces smoothness and is controlled by the parameter λ>0 (e.g. λ=2). Minimizing E($v_s$) may be done by solving the corresponding Euler-Lagrange equation: $\omega v_s - \lambda \Delta v_s = \omega v$ with the Neumann boundary conditions.

The sequence of maps described above associates an image location in an input image-frame (e.g. 320) with a corresponding location in the relaxed image-frame 360. In the case of image $I_j$, for instance, this sequence includes: 1) the static alignment map $q_j$, 2) the warping map $ũ_{ij}$, and 3) the global relaxation map $v_s$. In practice, to avoid multiple resampling, these maps may be concatenated into one total map and applied once. For example, the total map $m_j$ may be used to map image 320 onto its relaxed version (i.e. the relaxed image-frame) as illustrated in FIG. 3.

The final step in creating the panorama output 370 is the blending step 250. Once the total maps are computed for each input image-frame, the color value of an output panorama pixel may be determined based on the corresponding input image locations. For example, maps $m_i$ and $m_j$ may be used to relate an output panorama pixel with the corresponding image locations in 310 and 320. A blending strategy is used within overlapping regions, e.g. $\Omega_{ij}$, where, for example, two color values from image locations in 310 and 320 may contribute to the corresponding output panorama pixel. Determining an output panorama pixel's value, then, may be done by averaging the corresponding values from the input image-frames, possibly giving a larger weight to a value coming from a pixel location that is closer to the centroid of the respective input image-frame. Other blending methods such as the multi-resolution spline technique are known in the art.

Exemplary embodiments of this invention provide systems and methods for constructing panoramic video captured by cameras positioned in unstructured configurations. In contrast to methods in the art that require camera calibration and 3D reconstruction, embodiments of this invention rely on homographies that are applied directly to the input image-frames. This approach tolerates dynamic-cameras, i.e. cameras that move jointly and relative to each other. When using dynamic-cameras, the size and content of pairwise image overlaps may change over time. In general, this may affect the quality of parallax removal. One advantage of the embodiments described herein is that the warping-order may be recomputed, as explained above, to account for these changes in the size and content of the pairwise image overlaps.

Applications of interest may include using the output panoramic video to create a cut program. A camera rig 110 may be positioned to cover a sporting event such as a football game. As mentioned above, embodiments of this invention are not susceptible to the cameras' movements (as a result of platform vibrations, for example). To cut a program, a region-of-interest (a sub-region within the output panorama frame) may be selected and extracted to form the final video feed. This region-of-interest may be set to track the game activities and may be selected either manually or automatically. More than one region-of-interest may be extracted to form multiple programs or targeted productions. In addition, highlights may be extracted to form playbacks. Since the high-resolution panorama in an embodiment may span the entirety of the football field, unpredictable events may be captured by the output panoramic video to be cut into playback segments and be part of the television production.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. Embodiments of this invention may include known video stitching methods that are augmented by one or more of the techniques discussed above for improving panoramic video quality and coherency, such as warping the aligned frame-images according to an optimal warping order 220, relaxing the warped image-frames 240, or using the parallax-warping-error metric (for warping or for finding the optimal order) as described above. Furthermore, the parallax-warping-error metric may be used independently to evaluate or compare the stitching performance of other video stitching methods. Alternatively, the parallax-warping-error metric may serve as a feedback mechanism to improve other methods for panoramic video generation.

The foregoing description of the specific embodiments describe the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the terminology herein is for the purpose of description and not of limitation, such that the terminology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for constructing a panoramic video, comprising:
   receiving a plurality of input image-frames, wherein the plurality of input image-frames are temporally corresponding frames of respective input video streams;
   aligning the plurality of input image-frames to create a plurality of pairs of aligned image-frames and a reference panorama frame;
   warping the plurality of pairs of aligned image-frames according to a warping-order to create an intermediate panorama frame including a plurality of warped image-frames, wherein the warping-order is determined based on an overlap-region size corresponding to the plurality of pairs of aligned image-frames;
   relaxing the plurality of warped image-frames to create a relaxed panorama frame that is temporally coherent and including a plurality of relaxed image-frames; and
   blending the plurality of relaxed image-frames, to create an output panorama frame.

2. The method of claim 1, wherein the input video streams are captured by cameras positioned in an unstructured configuration.

3. The method of claim 1, wherein the input video streams are captured by dynamic-cameras, wherein the dynamic-cameras move jointly and relative to each other.

4. The method of claim 1,
   wherein the warping includes warping a first aligned image-frame of one of the plurality of pairs of aligned image-frames onto a second aligned image-frame of the one of the plurality of pairs of aligned image-frames using an optical-flow to create a first warped image-frame; and wherein the warping is optimized based on a parallax-warping-error, wherein the parallax-warping-error quantifies differences between the first aligned image-frame and the second aligned image-frame contributed by a plurality of parallax artifacts.

5. The method of claim 4, wherein the warping further includes comparing a warped patch from the first warped image-frame with a first corresponding patch from the first aligned image-frame, wherein the comparing comprises mapping the warped patch onto the first corresponding patch using a homograpy, wherein the homography is fitted to the optical flow defined within the warped patch.

6. The method of claim 1, wherein the warping-order is determined based on a graph including nodes, edges, and weights, wherein:
  each node is associated with one of the plurality of aligned image-frames;
  each edge connects a pair of nodes, wherein the pair of nodes corresponds to the plurality of pairs of aligned image-frames; and
  each weight is associated with each edge and is proportional to a warping-quality score associated with the edge-connected pair of nodes.

7. The method of claim 6, wherein the warping-quality score is a function of an overlap-region between the plurality of aligned image-frames associated with the edge-connected pair of nodes and a parallax-warping-error that quantifies differences within the overlap-region contributed by a plurality of parallax artifacts.

8. The method of claim 1, wherein the relaxing the plurality of warped image-frames includes
  calculating a backward-map that maps an output-pixel from a first warped image frame in the intermediate panorama to a corresponding input-pixel in a first aligned image-frame in the reference panorama and wherein if more than one corresponding input-pixel from more than one aligned image-frames contribute to the output-pixel, the backward-map maps the output-pixel to an average position of the more than one corresponding input-pixels; and
  computing a relaxed-map that minimizes an energy function including a distance-measure between the relaxed-map and the backward-map and a smoothness constraint.

9. The method of claim 1, further comprising cutting at least one program, wherein the at least one program includes a region-of-interest extracted from the output panorama frame.

10. A system for constructing a panoramic video, comprising:
  a camera rig, configured to hold a plurality of cameras in an unstructured configuration, wherein the cameras operate to capture input video streams; and
  a processor for constructing the panoramic video, wherein the processor receives the input video streams and is configured to:
    buffer the input video streams to produce a plurality of input image-frames, wherein the input image-frames are temporally corresponding frames of respective input video streams;
    align the plurality of input image-frames to create a plurality of pairs of aligned image-frames and a reference panorama frame;
    warp the plurality of pairs of aligned image-frames according to a warping-order to create an intermediate panorama frame including a plurality of warped image-frames, wherein the warping-order is determined based on an overlap-region size corresponding to the plurality of pairs of aligned image-frames;
    relax the plurality of warped image-frames to create a relaxed panorama frame that is temporally coherent and including a plurality of relaxed image-frames; and
    blend the plurality of relaxed image-frames to create an output panorama frames.

11. The system of claim 10,
  wherein the warping includes warping a first aligned image-frame of one of the plurality of pairs of aligned image-frames onto a second aligned image-frame of the one of the plurality of pairs of aligned image-frames using an optical-flow to create a first warped image-frame; and
  wherein the warping is optimized based on a parallax-warping-error, wherein the parallax-warping-error quantifies differences between the first aligned image-frame and the second aligned image-frame contributed by a plurality of parallax artifacts.

12. The system of claim 11, wherein the warping further includes comparing a warped patch with a first corresponding patch comprises mapping the warped patch onto the first corresponding patch using a homograpy, wherein the homography is fitted to the optical flow defined within the warped patch.

13. The system of claim 10, wherein the warping-order is determined based on a graph including nodes, edges, and weights, wherein
  each node is associated with one of the plurality of aligned image-frames;
  each edge connects a pair of nodes, wherein the pair of nodes corresponds to the plurality of pairs of aligned image-frames; and
  each weight is associated with each edge and is proportional to a warping-quality score associated with the edge-connected pair of nodes.

14. The system of claim 13, wherein the warping-quality score is a function of an overlap-region between the aligned image-frames associated with the edge-connected pair of nodes and a parallax-warping-error that quantifies differences within the overlap-region that are contributed by a plurality of parallax artifacts.

15. The system of claim 10, wherein the relaxing the warped image-frames includes
  calculating a backward-map that maps an output-pixel from a first warped image frame in the intermediate panorama to a corresponding input-pixel in a first aligned image-frame in the reference panorama and wherein if more than one corresponding input-pixel from more than one aligned image-frames contribute to the output-pixel, the backward-map maps the output-pixel to an average position of the more than one corresponding input-pixels; and
  computing a relaxed-map that minimizes an energy function including a distance-measure between the relaxed-map and the backward-map and a smoothness constraint.

16. The system of claim 10, wherein the plurality of cameras are dynamic-cameras, moving jointly and relative to each other.

17. The system of claim 10, wherein the processor is further configured to preprocess the plurality of input image-frames by compensating for lens distortions and radiometric differences.

18. The system of claim 10, wherein the processor is further configured to cut at least one program, wherein the at least one program includes region-of-interest extracted from the output panorama frame.

19. A non-transitory computer-readable storage medium storing a set of instructions that is executable by a processor, the set of instructions, when executed by the processor, causing the processor to perform operations comprising:
- receiving a plurality of input image-frames, wherein the plurality of input image-frames are temporally corresponding frames of respective input video streams;
- aligning the plurality of input image-frames to create a plurality of pairs of aligned image-frames and a reference panorama;
- warping the plurality of pairs of aligned image-frames according to a warping-order to create an intermediate panorama frame including a plurality of warped image-frames, wherein the warping-order is determined based on an overlap-region size corresponding to the plurality of pairs of aligned image-frames;
- relaxing the plurality of warped image-frames, to create a relaxed panorama frame that is temporally coherent and including a plurality of relaxed image-frames; and
- blending the plurality of relaxed image-frames, to create an output panorama frame.

* * * * *